United States Patent
Ikeda

(10) Patent No.: US 10,721,055 B2
(45) Date of Patent: Jul. 21, 2020

(54) COMMUNICATION DEVICE

(71) Applicant: RENESAS ELECTRONICS CORPORATION, Tokyo (JP)

(72) Inventor: Yuji Ikeda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/407,964

(22) Filed: May 9, 2019

(65) Prior Publication Data

US 2019/0372749 A1 Dec. 5, 2019

(30) Foreign Application Priority Data

May 31, 2018 (JP) .................. 2018-104834

(51) Int. Cl.
*H04L 7/00* (2006.01)
*H04B 5/00* (2006.01)
*G06F 1/12* (2006.01)

(52) U.S. Cl.
CPC .............. *H04L 7/0087* (2013.01); *G06F 1/12* (2013.01); *H04B 5/005* (2013.01); *H04L 7/0091* (2013.01); *H04T 2001/111* (2013.01)

(58) Field of Classification Search
CPC ....... H04L 7/0008; H04L 7/02; H04L 7/0331; H04L 25/0278; H04B 1/04; H04B 5/0012
USPC .......................................... 375/354
See application file for complete search history.

(56) References Cited

U.S. PATENT DOCUMENTS

| | | | |
|---|---|---|---|
| 8,948,276 B2 | 2/2015 | Kaeriyama | |
| 9,350,441 B2* | 5/2016 | Trook | ............... H04B 1/525 |
| 9,959,899 B2* | 5/2018 | Kita | ............... G11B 15/1875 |
| 2011/0255585 A1* | 10/2011 | Lee | ............... H03M 9/00 375/229 |
| 2018/0041233 A1* | 2/2018 | Takeda | ............... H04B 1/40 |

FOREIGN PATENT DOCUMENTS

JP 2013-229815 A 11/2013

* cited by examiner

*Primary Examiner* — Khai Tran
(74) *Attorney, Agent, or Firm* — McDermott Will & Emery LLP

(57) ABSTRACT

The sampling data signal and the sampling synchronizing clock are generated by sampling the data signal and the synchronizing clock, and the first driving pulse signal and the second driving pulse signal are generated based on the sampling data signal and the sampling synchronizing clock, and the isolator is driven by the first driving pulse signal and the second driving pulse signal.

12 Claims, 16 Drawing Sheets

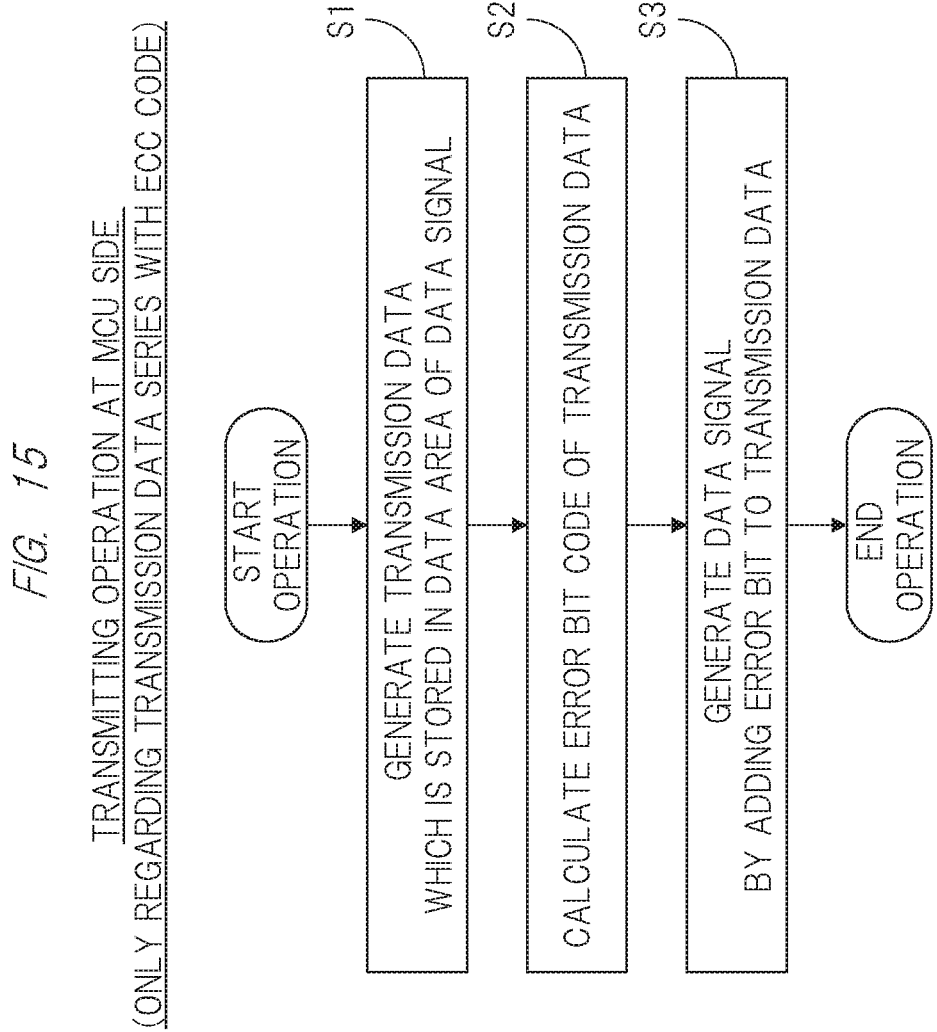

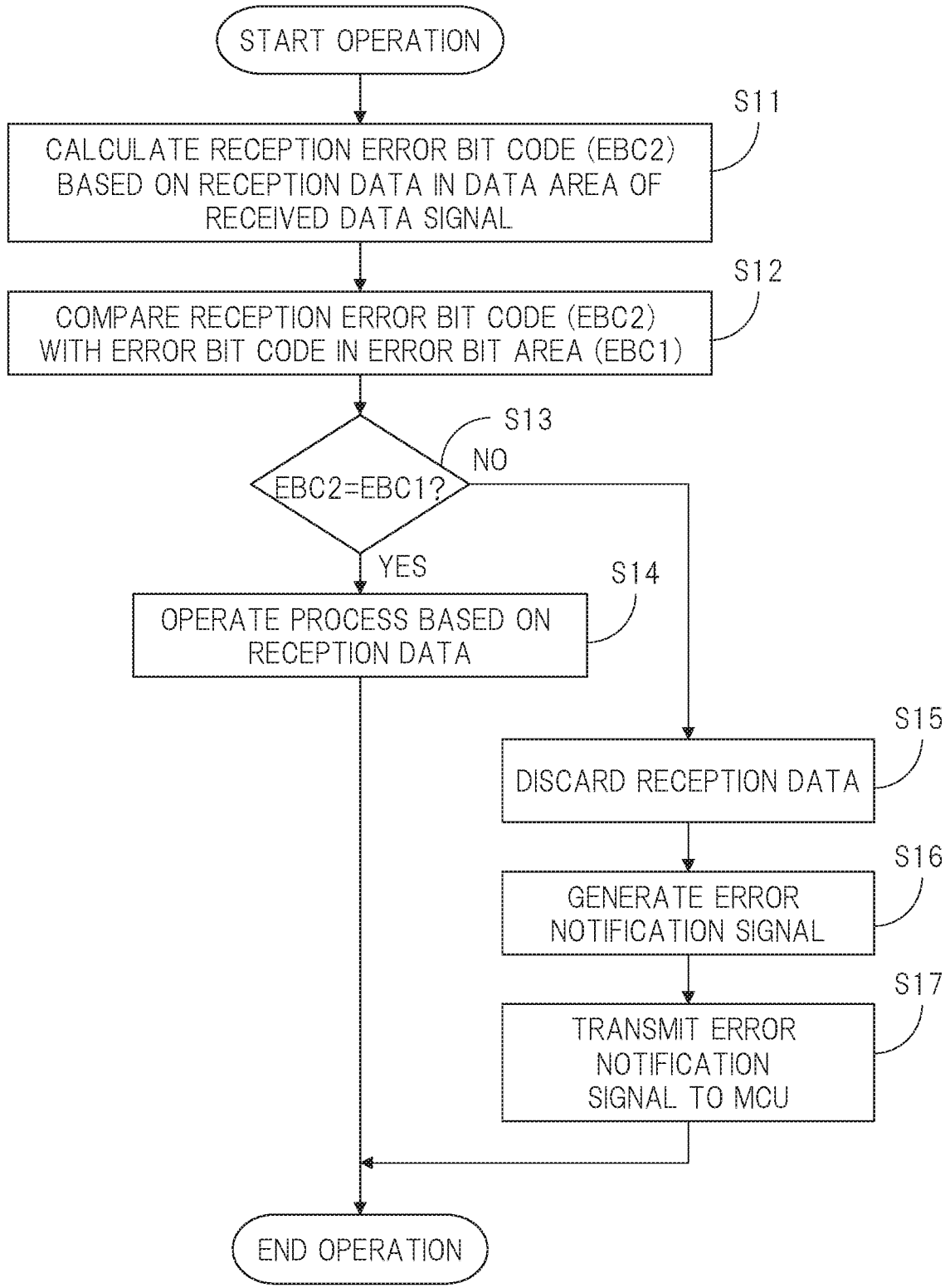

COMMUNICATION DEVICE

CROSS-REFERENCE TO RELATED APPLICATIONS

The disclosure of Japanese Patent Application No. 2018-104834 filed on May 31, 2018 including the specification, drawings and abstract is incorporated herein by reference in its entirety.

BACKGROUND

The present invention relates to a semiconductor device, and, for example, to a semiconductor device for transmitting and receiving signals between circuits operating at different power supply voltages by using an isolator such as a transformer.

In recent years, many systems have been proposed for controlling a power device handling a high voltage by a control circuit operating at a lower voltage than the voltage supplied to the power device. In such a system, an isolator is used to transmit and receive signals between circuits operating at different voltage sources. An example of a semiconductor device that performs communication using such an isolator is disclosed in JP-A-2013-229815.

The semiconductor device disclosed in JP-A-2013-229815 includes: a transmission circuit that operates in a first power supply system and outputs a pulse signal based on an input data signal and a first retransmission request signal; a receiving circuit that operates in a second power supply system different from the first power supply system and restores a data signal based on a pulse signal; and an insulating coupling element that couples the transmission circuit and the receiving circuit with a magnetic field or an electric field, and the transmission circuit generates a delayed data signal and a first delayed retransmission request signal by delaying the data signal and the first retransmission request signal, respectively, outputs the pulse signal at the edge of the delayed data signal and the first delayed retransmission request signal, and prohibits the output of the pulse signal at the edge of the first delayed retransmission request signal for a predetermined period spanning the edge of the delayed data signal. In the technique described in Patent Document 1, the erroneous transmission of data is prevented by prohibiting the output of the pulse signal at the edge of the first delay retransmission request signal for a predetermined period of time spanning the edge of the delayed data signal.

SUMMARY

In the technique described in JP-A-2013-229815, only one signal can be communicated by one isolator. In recent years, SPI (Serial Peripheral Interface) communication is sometimes used for communication between a control unit (e.g., MCU (Micro Controller Unit)) and a power device in order to improve the accuracy of measuring the temperature of the power device, adjust the driving capability of the power device, and add a function of setting thresholds used when performing control based on various measured values. The SPI communication uses three signal lines, i.e., DATA signal lines, CLK signal lines, and OUT signal lines. Therefore, in a system using SPI communication, three isolators are used for communication of a set of SPI signals. However, since the isolator is an element having a large area in the chip, the increase of the isolator greatly affects the chip size. That is, in the technique described in Patent Document 1, there is a problem that the chip area increases due to an increase in the number of isolators as the number of signal lines increases.

Other objects and novel features will become apparent from the description of this specification and the accompanying drawings.

According to one embodiment, a semiconductor device includes a transmission circuit, an isolator, and a receiving circuit, wherein the transmission circuit samples a data signal and a synchronization clock serving as a synchronization signal of a data signal by a sampling clock to generate a sampling data signal and a sampling synchronization clock, generates a first drive pulse signal having a pulse synchronized with both a rising edge of a sampling data signal and a rising edge of a sampling synchronization clock within a period in which the sampling data signal becomes a first logic level, generates a second drive pulse signal having a pulse synchronized with both a falling edge of the sampling data signal and rising edge of the sampling synchronization clock within a period in which the sampling data signal becomes a second logic level opposite to the first logic level, and drives the isolator by the first drive pulse signal and the second drive pulse signal.

According to the above embodiment, the semiconductor device can reduce the number of isolators with respect to the number of signals to be transmitted and received.

BRIEF DESCRIPTION OF THE DRAWINGS

FIG. 15 is a flowchart illustrating a procedure for generating a data signal in the semiconductor device according to the fourth embodiment;

FIG. 16 is a flowchart illustrating reception processing on the receiving circuit side of the semiconductor device according to the fourth embodiment;

DETAILED DESCRIPTION

Figure 1:
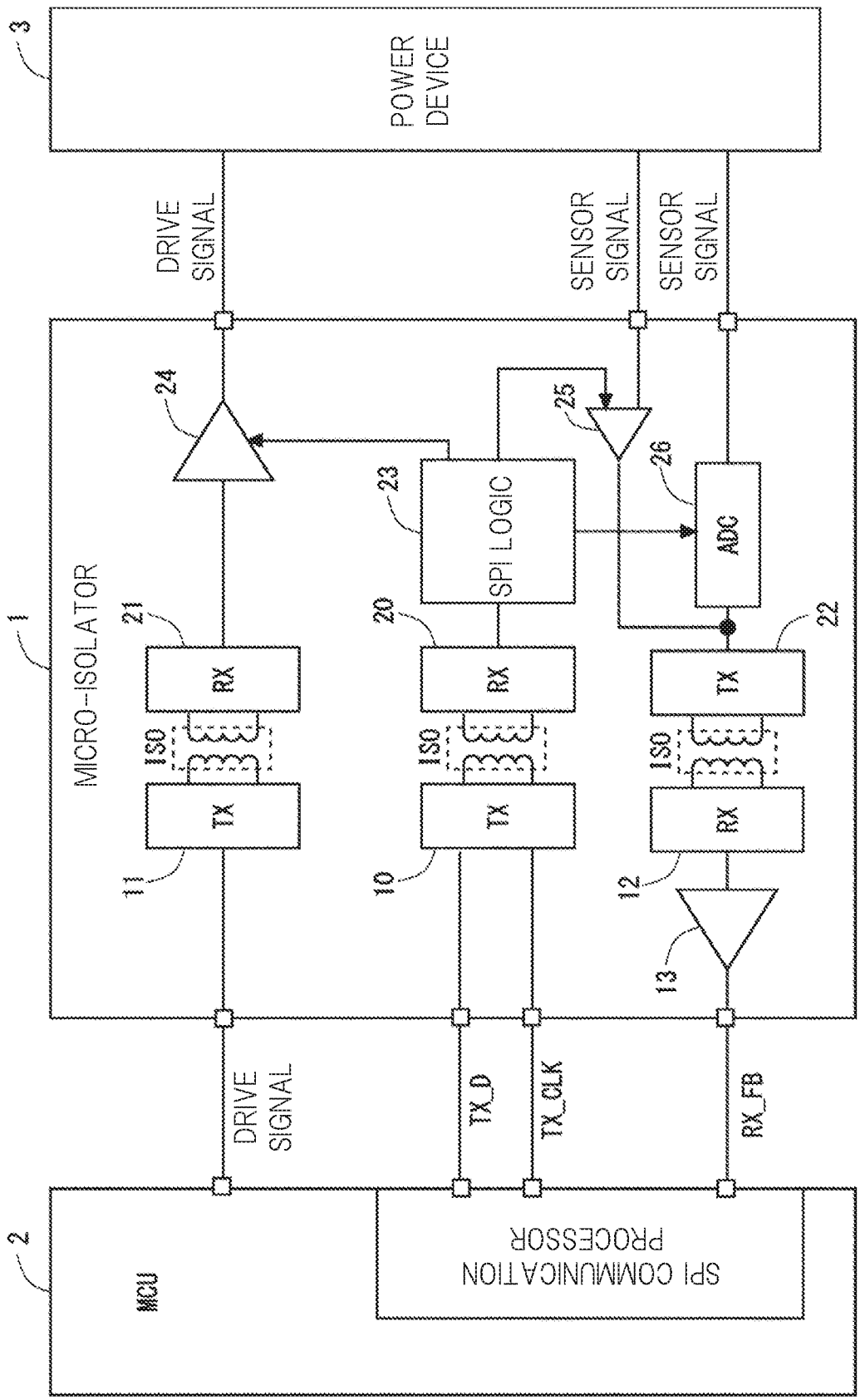
FIG. 1 is a block diagram of a power device system including a semiconductor device according to a first embodiment.

For clarity of explanation, the following description and drawings are appropriately omitted and simplified. In addition, the respective elements described in the drawings as functional blocks for performing various processes can be configured by a CPU (Central Processing Unit), a memory, and other circuits in terms of hardware, and are realized by programs loaded in the memory in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory), CD-R, CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

First, in order to explain the outline of the semiconductor device according to the first embodiment, for example, the micro-isolator 1, a power device system including the micro-isolator 1 according to the first embodiment will be described. FIG. 1 shows a block diagram of a power device system including the micro isolator 1 according to the first embodiment.

As shown in FIG. 1, in a power device system including a microisolator 1 according to the first embodiment, a MCU (Micro Controller Unit) 2 and a power device 3 are disposed with the microisolator 1 sandwiched therebetween. The MCU2 includes an arithmetic unit for executing programs, and peripheral circuits such as a timer, an input/output interface, and a communication interface used by the arithmetic unit. The MCU2 outputs drive signals for controlling the power devices from the output interfaces. The MCU2 has an SPI communication processor as one of communication interfaces. The MCU2 acquires sensor data detected by various sensors provided in the power device 3 by the SPI communication processor. In this SPI communication, sensor information is acquired using a data signal TX_D, a synchronous clock TX_CLK, and an output signal, for example, a feedback signal RX_FB.

In the power device system shown in FIG. 1, the power supply voltage for operating the MCU2 is set lower than the power supply voltage for operating the power device 3. In the power device system shown in FIG. 1, the micro-isolator 1 is used to convert the amplitude of the signals outputted by the MCU2 into an amplitude suitable for control of the power device 3. The micro-isolator 1 outputs values indicated by sensor signals acquired from sensors provided in the power device 3 to the MCU2 in response to a request from the MCU2.

In the example shown in FIG. 1, the micro-isolator 1 performs voltage conversion using a built-in isolator ISO. The isolator ISO comprises a primary coil and a secondary coil. In a path for transmitting drive signals from the MCU2 to the power device 3, the transmitting circuit 11 is connected to the primary coil of the isolator ISO, and the receiving circuit 21 is connected to the secondary coil of the isolator ISO. The transmission circuit 11 drives the primary coil of the isolator ISO by, for example, a pulse signal corresponding to a rising edge and a falling edge of the drive signal. Further, the receiving circuit 21 reproduces a drive signal based on, for example, a pulse signal generated in the secondary coil, and transmits the drive signal to the output buffer 24. The output buffer 24 outputs a drive signal for driving the power device 3 based on the drive signal received from the receiving circuit 21. The output buffer 24 can adjust the driving capability based on an instruction from the SPI logic 23.

In the example shown in FIG. 1, the micro-isolator 1 includes SPI logic 23 for processing data transmitted by SPI communication. The SPI logic 23 adjusts the driving force of the output buffer 24 based on the received data, sets a reference voltage with respect to the sensor signal supplied to the comparator 25, and sets a conversion process of the analog-to-digital converter 26 for converting the sensor signal into an analog-to-digital converter. The micro isolator 1 uses one isolator ISO for the transmission path of the data signal TX_D and the synchronization clock TX_CLK. Then, the transmitting circuit 10 drives the primary coil of the isolator ISO, and the receiving circuit 20 receives the pulse signal generated in the secondary coil of the isolator ISO, thereby transmitting the data outputted by the MCU2 to the SPI logic 23 based on the data signal TX_D and the synchronization clock TX_CLK.

Further, in the embodiment shown in FIG. 1, one isolator ISO is used to transmit one signal in the path for transmitting the feedback signal RX_FB corresponding to the output signal of the SPI communication signal output from the micro isolator 1 to the MCU2. Specifically, in this path, the primary coil of the isolator ISO is driven by the transmitting circuit 22, the receiving circuit 12 reproduces the feedback signal RX_FB based on the pulse signal generated in the secondary coil of the isolator ISO, and transmits the reproduced feedback signal RX_FB to the MCU2 via the output buffer 13.

Figure 2:
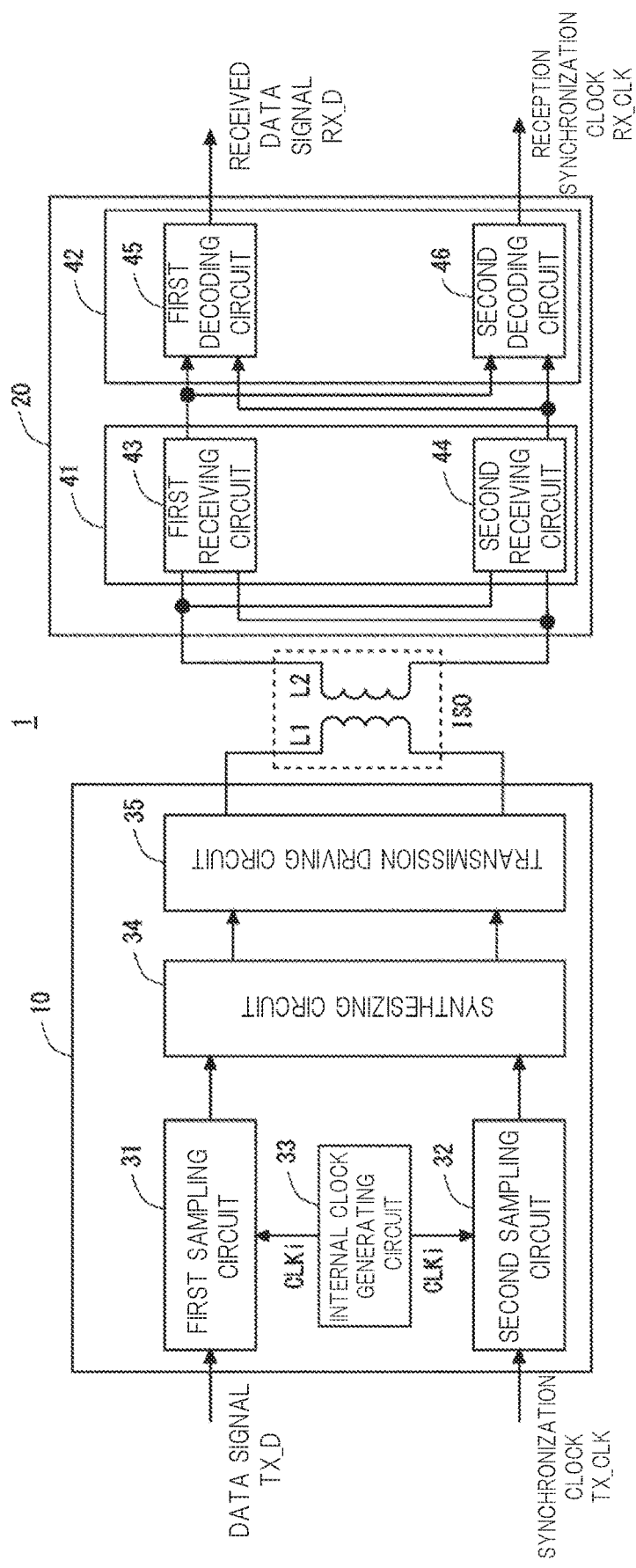
FIG. 2 is a block diagram of a semiconductor device according to a first embodiment.

Here, the micro isolator 1 according to the first embodiment has one of the features of the configurations of the transmission circuit 10 and the receiving circuit 20 provided in the path for transmitting the data signal TX_D and the synchronous clock TX_CLK. FIG. 2 shows a block diagram of the micro isolator 1 according to the first embodiment. In FIG. 2, a block diagram of the transmitting circuit 10 and the receiving circuit 20 of the micro isolator 1 is shown.

The transmission circuit 10 receives the data signal TX_D and the synchronization clock TX_CLK serving as a synchronization signal with respect to the data signal TX_D, samples the data signal TX_D and the synchronization clock TX_CLK by the sampling clock CLKi having a higher frequency than the synchronization clock TX_CLK, and generates a transmission pulse (for example, a first drive pulse signal and a second drive pulse signal output from the synthesis circuit 34). The isolator ISO has a primary coil L1 driven by a driving pulse generated based on a transmission pulse, and a secondary coil L2 electromagnetically coupled to the primary coil L1. The receiving circuit 20 regenerates the reception data signal RX_D corresponding to the data signal TX_D and the reception synchronization clock RX_CLK corresponding to the synchronization clock TX_CLK based on the reception pulse generated in the secondary coil L2.

Here, in synchronization with the sampling clock CLKi, the transmitter 10 generates a data edge pulse having a polarity corresponding to a change in the logical level of the data signal TX_D, and generates a synchronous edge pulse corresponding to an edge including at least a rising edge of the synchronous clock TX_CLK and having a polarity corresponding to the polarity of the data signal TX_D at the time of sampling. The transmission circuit 10 outputs the data edge pulse as a transmission pulse when the data edge pulse and the synchronization edge pulse overlap and are input, and outputs the synchronization edge pulse as a transmission pulse when only the synchronization edge pulse is input.

As shown in FIG. 2, the transmission circuit 10 includes a first sampling circuit 31, a second sampling circuit 32, an internal clock generating circuit 33, a synthesizing circuit 34, and a driving circuit, for example, a transmission driving circuit 35. The receiving circuit 20 includes a first receiving circuit 41 and a clock receiving circuit 42. An isolator ISO is provided between the transmitting circuit 10 and the receiving circuit 20. The primary coil L1 of the isolator ISO is driven by the transmitter circuit 10. The secondary coil L2 of the isolator ISO is connected to the receiving circuit 20. The micro-isolator 1 according to the first embodiment performs communication between circuits operating at different power supply voltages (e.g., between the transmission circuit 10 and the receiving circuit 20) by converting the amplitude of a signal according to the winding ratio of the primary coil L1 and the secondary coil L2. It is assumed that the power supply voltage of the transmitting circuit 10 is the same first voltage as the power supply voltage of the MCU2, and the power supply voltage of the receiving circuit 20 is the same second voltage as the power supply voltage of the power devices 3. It is also assumed that the first voltage<the second voltage.

In the transmitting circuit 10, the internal clock generating circuit 33 generates a sampling clock CLKi having a higher frequency than the synchronization clock TX_CLK, which is a synchronization signal with respect to the data signal TX_D to be transmitted. The transmitting circuit 10 transmits the sampling clock CLKi to the first sampling circuit 31 and the second sampling circuit 32 via the sampling clock line. In the following description, an example in which the sampling clock wiring, the first sampling circuit 31, the second sampling circuit 32, the synthesizing circuit 34, the isolator ISO, the data receiving circuit 41, and the clock receiving circuit 42 are formed on one semiconductor chip will be described. The internal clock generation circuit 33 may be formed on a semiconductor chip on which the micro-isolator 1 is formed, or may be formed on a semiconductor chip on which the micro-isolator 1 is formed. In the following description, an example in which the internal clock generation circuit 33 is formed on a semiconductor chip on which the micro-isolator 1 is formed will be described.

The first sampling circuit 31 samples the data signal TX_D with the sampling clock CLKi to generate a sampled data signal whose rising edge and falling edge are synchronized with the rising edge of the sampling clock. The second sampling circuit 32 samples the synchronous clock TX_CLK with the sampling clock CLKi, and generates a sampling synchronous clock in which the rising edge and the falling edge are synchronized with the rising edge of the sampling clock CLKi.

The synthesizing circuit 34 generates a first driving pulse signal having a pulse synchronized with both the rising edge of the sampling data signal and the rising edge of the sampling synchronization clock within a period in which the data signal TX_D is at the first logic level, and a second driving pulse signal having a pulse synchronized with both the falling edge of the sampling data signal and the rising edge of the sampling synchronization clock within a period in which the data signal TX_D is at the second logic level opposite to the first logic level.

The transmission driving circuit 35 drives the primary coil L1 of the isolator ISO based on the first driving pulse signal and the second driving pulse signal. Specifically, the transmission drive circuit 35 causes a positive current (for example, a drive current flowing from one terminal to the other) to flow in the primary coil L1 based on the first drive pulse signal, and causes a negative current (for example, a drive current flowing from the other terminal to the one terminal) to flow in the primary coil L1 based on the second drive pulse signal. Then, the transmission drive circuit 35 drives the primary coil L1 based on the first drive pulse signal and the second drive pulse signal to generate a reception pulse having a positive electrode pulse corresponding to the first drive pulse signal and a negative electrode pulse corresponding to the second drive pulse signal on the secondary coil L2 side.

The data receiving circuit 41 generates a reception data signal in which a rising edge and a falling edge appear in accordance with a change in polarity of a reception pulse. The data receiving circuit 41 includes a first receiving circuit 43 and a first decoding circuit 44. The clock receiving circuit 42 generates a reception synchronous clock which has rising edges corresponding to inputs of reception pulses and has a duty ratio set in advance. The clock receiving circuit 42 includes a second receiving circuit 45 and a second receiving circuit 46.

The first receiving circuit 43 generates a first reproduced signal having a pulse corresponding to the positive electrode pulse. The second receiving circuit 45 generates a second reproduction signal having a pulse corresponding to the negative pulse. The first decoding circuit 44 outputs a reception data signal RX_D which becomes a high level based on the pulse of the first reproduction signal and becomes a low level in response to the pulse of the second reproduction signal. The second receiving circuit 46 outputs the logical sum of the first reproduced signal and the second reproduced signal as a reception synchronization clock RX_CLK.

Figure 3:
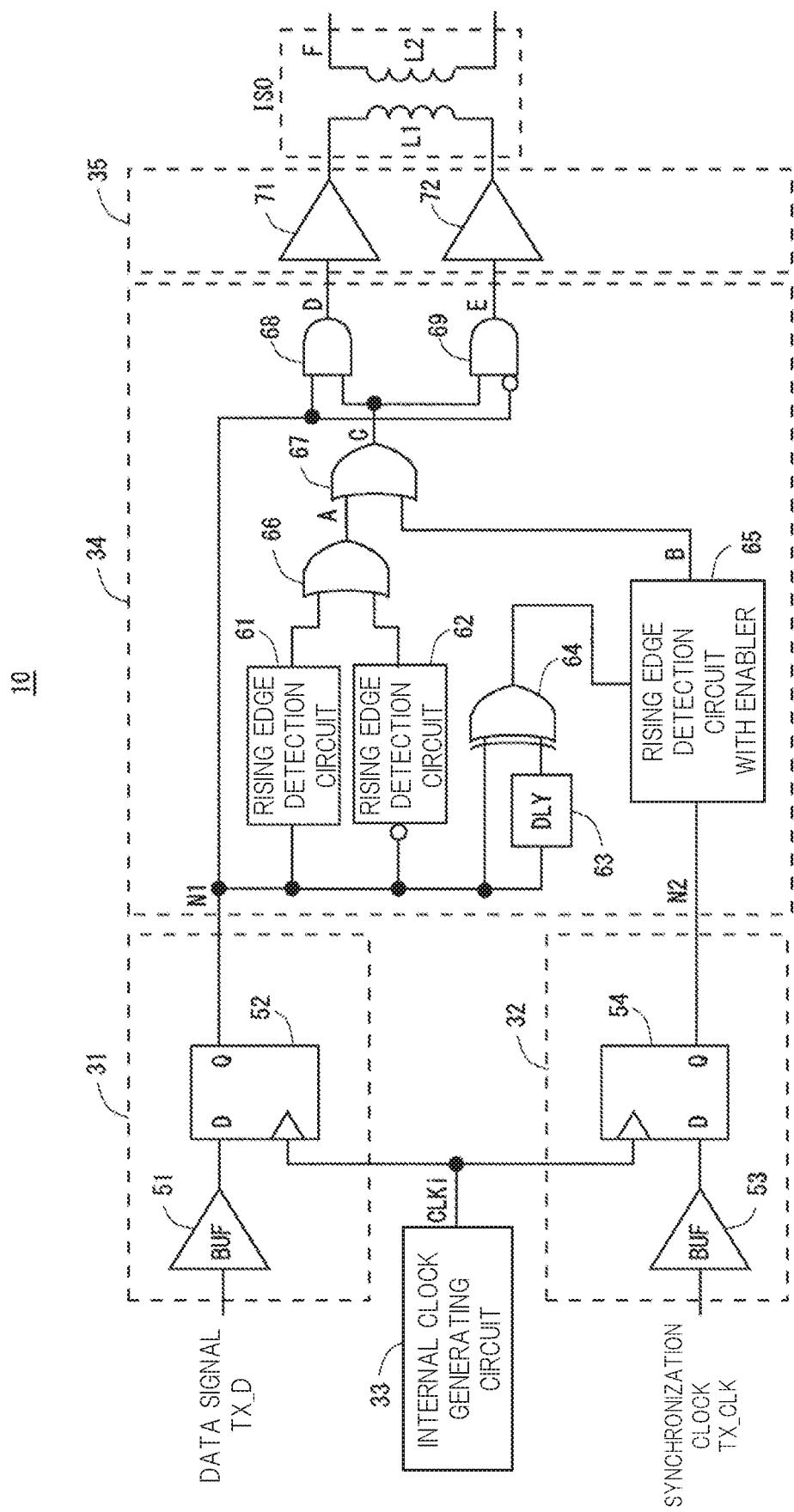
FIG. 3 is a block diagram of a transmission circuit according to a first embodiment.

Next, the circuit configuration of the transmission circuit 10 according to the first embodiment will be described in more detail. FIG. 3 shows a block diagram of the transmission circuit 10 according to the first embodiment. As shown in FIG. 3, the first sampling circuit 31 includes an input buffer 51 and a D flip-flop 52. The input buffer 51 receives the data signal TX_D and transmits the data signal TX_D to the D flip-flop 52 in the subsequent stage. The D flip-flop 52 holds the logical level of the data signal TX_D in response to the sampling edge of the sampling clock CLKi. Then, the D flip-flop 52 outputs the held value as a sampling data signal to the node N1.

The second sampling circuit 32 includes an input buffer 53 and a D flip-flop 54. The input buffer 53 receives the synchronous clock TX_CLK and transmits it to the D flip-flop 54 in the subsequent stage. The D flip-flop 54 holds the logical level of the synchronous clock TX_CLK in response to the sampling edge of the sampling clock CLKi being inputted.

Then, the D flip-flop 54 outputs the held value to the node N2 as the sampling synchronization clock.

The combining circuit 34 includes a first rising edge detection circuit (e.g., a rising edge detection circuit 61), a falling edge detection circuit 62, a delay circuit 63, a EXOR circuit 64, a second rising edge detection circuit (e.g., a rising edge detection circuit with enabler 65), a first OR circuit (e.g., an OR circuit 66), a second OR circuit (e.g., an OR circuit 67), a first AND circuit (e.g., an AND circuit 68), and a second AND circuit (e.g., an AND circuit 69).

The rising edge detection circuit 61 detects a rising edge of the sampling data signal and generates a first pulse signal having a predetermined pulse width. The falling edge detection circuit 62 is a rising edge detection circuit of the row active input. The falling edge detection circuit 62 detects a falling edge of the sampling data signal and generates a second pulse signal having a predetermined pulse width. The OR circuit 66 calculates a logical sum of the first pulse signal and the second pulse signal. Then, the OR circuit 66 outputs the value obtained by the calculation to the node A.

The delay circuit 63 delays the sampling data signal transmitted through the node N1. The EXOR circuit 64 ouputs an exclusive-OR of the sampled data signal and the output signal of the delay circuit 64. The output signal of the EXOR circuit 64 is an enable control signal of the rise edge detection circuit with enabler 65. This enable control signal indicates a disable state for instructing to stop the operation of the rising edge detection circuit with enabler 65 when it is in the high level state, and indicates a disable state for invalidating the enabled rising edge detection circuit with enabler 65 when it is in the low level state.

The rising edge detecting circuit with enabler 65 operates while the output signal of the EXOR circuit 64 is at the low level, detects the rising edge of the sampling synchronization clock, and generates a third pulse signal having a predetermined pulse width. The third pulse signal is transmitted to the OR circuit 67 via the node B.

The OR circuit 67 outputs the logical sum of the output signal of the OR circuit 66 (the signal of the node A) and the third pulse signal (the signal of the node B). The AND circuit 68 passes the output signal of the OR circuit 67 while the sampling data signal is at the high level, and outputs the first driving pulse signal. The first driving pulse signal is output to the driving circuit 71 in the subsequent stage via the node D. The AND circuit 69 passes the output signal of the OR circuit 67 while the sampling data signal is at the low level, and outputs the second driving pulse signal. The second driving pulse signal is output to the driving circuit 72 in the subsequent stage via the node E.

The output of the driving circuit 71 is connected to one end of the primary coil L1. Then, the drive circuit 71 applies a drive current in the positive direction to the primary coil L1 based on the first drive pulse signal applied via the node D. The output of the driving circuit 72 is connected to the other end of the primary coil L1. Then, the drive circuit 72 applies a drive current in the negative direction to the primary coil L1 based on the second drive pulse signal applied via the node E.

Figure 4:
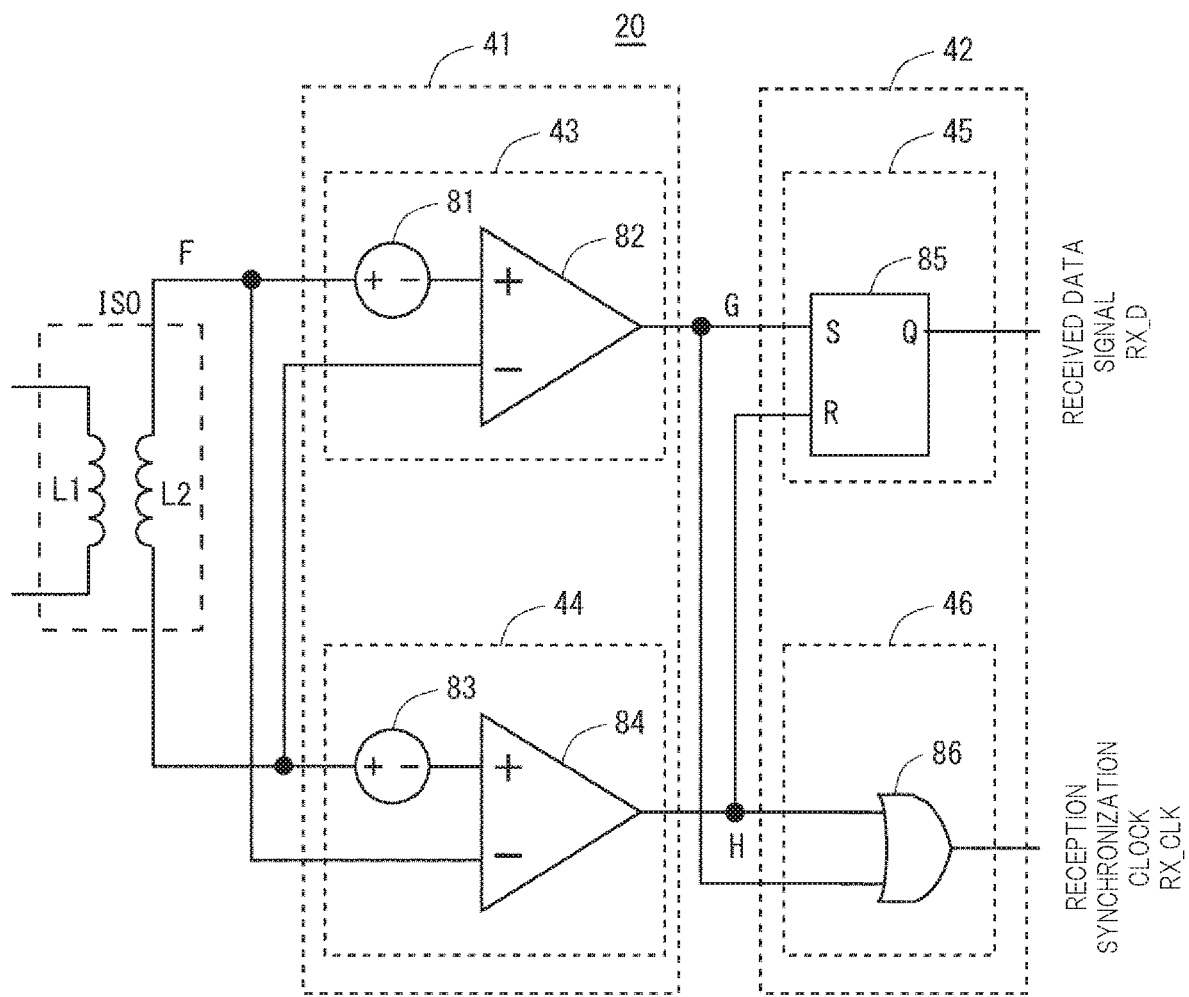
FIG. 4 is a block diagram of a receiving circuit according to the first embodiment.

Next, the circuit configuration of the receiving circuit 20 according to the first embodiment will be described in more detail. FIG. 4 is a block diagram of the receiving circuit 20 according to the first embodiment. As shown in FIG. 4, the receiving circuit 20 includes a data receiving circuit 41 and a clock receiving circuit 42. The data receiving circuit 41 includes a first receiving circuit 43 and a first decoding circuit 44. The clock receiving circuit 42 includes a second receiving circuit 45 and a second receiving circuit 46. As shown in FIG. 4, in the following description, a terminal of the secondary coil L2 on the side connected to the voltage shift circuit 81 and the inverting input terminal of the comparator 85 is referred to as a node F. When the node F is one end of the secondary coil L2, a terminal different from the one end of the secondary coil L2 is the other end.

The first receiving circuit 43 includes a voltage shift circuit 81 and a comparator 82. The voltage shift circuit 81 shifts the voltage of the received signal generated at one end of the secondary coil L2, for example, the node F, so as to step down the voltage, and applies the shifted received signal to the non-inverting input terminal of the comparator 82. The comparator 82 has a non-inverting input terminal to which a received signal voltage-shifted by the voltage shift circuit 81 is applied, and has an inverting input terminal to which a received signal generated at the other end of the secondary coil L2 is applied. The comparator 82 compares the magnitude relationship between the signals applied to the non-inverting input terminal and the inverting input terminal, and switches the logic level of the output signal from the low level to the high level in response to the voltage of the signal applied to the non-inverting input terminal becoming larger than the voltage of the signal applied to the inverting input terminal. The output signal of the comparator 82 is transmitted to the circuit in the subsequent stage via the node G.

The second receiving circuit 45 includes a voltage shift circuit 84 and a comparator 85. The voltage shift circuit 84 shifts the voltage so as to step down the voltage of the reception signal generated at the other end of the secondary coil L2, and applies the shifted reception signal to the non-inverting input terminal of the comparator 85. The comparator 85 has a non-inverting input terminal to which a received signal voltage-shifted by the voltage shift circuit 84 is applied, and has an inverting input terminal to which a received signal generated at one end of the secondary coil L2 is applied. The comparator 85 compares the magnitude relationship between the signals applied to the non-inverting input terminal and the inverting input terminal, and switches the logic level of the output signal from the low level to the high level in response to the voltage of the signal applied to the non-inverting input terminal becoming larger than the voltage of the signal applied to the inverting input terminal. The output signal of the comparator 85 is transmitted to the circuit in the subsequent stage via the node H.

The first decoding circuit 44 includes an SR latch circuit 83. In the SR latch circuit 83, the output signal of the comparator 82 is supplied to the set terminal S via the node G, and the output signal of the comparator 85 is supplied to the reset terminal R via the node H. The SR latch circuit 83 transitions the output from the low level to the high level in response to the input of the rising edge to the set terminal S, and transitions the output from the high level to the low level in response to the input of the rising edge to the reset terminal R. The output signal of the SR latch circuit 83 is the received data signal RX_D.

The second receiving circuit 46 includes an OR circuit 86. The OR circuit 86 has one terminal to which the output signal of the comparator 85 is applied via the node H, and the other terminal to which the output signal of the comparator 82 is applied via the node G. Then, the OR circuit 86 calculates the logical sum of the signals input to the two terminals, and outputs the calculation result as the reception synchronization clock RX_CLK.

Figure 5:
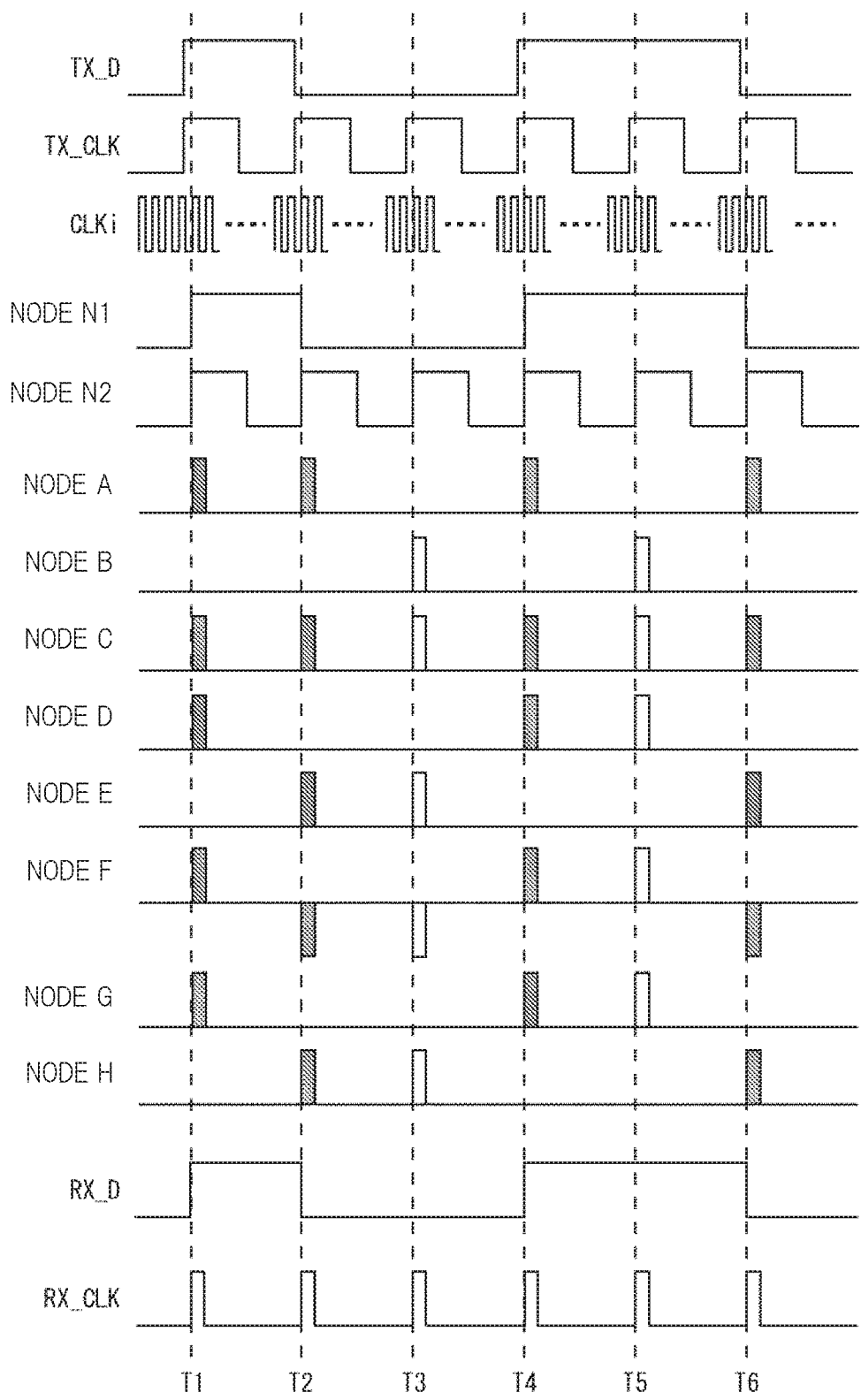
FIG. 5 is a timing chart for explaining the operation of the semiconductor device according to the first embodiment.

Next, the operations of the transmitting circuit 10 and the receiving circuit 20 will be described. FIG. 5 is a timing chart for explaining the operation of the micro isolator 1 according to the first embodiment. In FIG. 5, only the operations of the transmitting circuit 10 and the receiving circuit 20 in the micro-isolator 1 are shown. In FIG. 5, the pulse caused by the rising edge and the falling edge of the data signal TX_D is hatched, and the pulse caused by the rising edge of the synchronization clock TX_CLK is not hatched.

As shown in FIG. 5, in the transmitting circuit 10, the first sampling circuit 31 and the second sampling circuit 32 are used to sample the data signal TX_D and the synchronizing clock signal TX_CLK at the rising edge of the sampling clock signal CLKi. As a result, the first sampling circuit 31 and the second sampling circuit 32 generate the sampling data signal (node N1) and the sampling synchronization clock (node N2).

In the transmission circuit 10, the rising edge detection circuit 61 generates a first pulse signal having a rising edge corresponding to the rising edge of the sampling data signal. In the transmission circuit 10, the falling edge detection circuit generates a second pulse signal having a rising edge corresponding to the falling edge of the sampling data signal. The OR circuit 67 combines the first pulse signal and the second pulse signal to generate a pulse signal having a pulse synchronized with the rising edge and the falling edge of the sampling data signal at the node A at timings T1, T2, T4, and T6.

In the transmitting circuit 10, the delay circuit. 63 and the EXOR circuit 64 generate an enable control signal for disabling the rising-edge detecting circuit 65 with enabler for a predetermined period (a delay period set by the delay circuit 63) from a change in logical levels of the sampled data signal.

Then, the rising edge detection circuit with enabler 65 stops the detection operation of the rising edge of the sampling synchronization clock for a predetermined period from the period in which the enable control signal indicates the disable state, that is, the period in which the logic level of the sampling data signal changes, at timings T1, T2, T4, and T6. On the other hand, the rising edge detection circuit with enabler 65 performs the detection operation of the rising edge of the sampling synchronization clock during a period other than a predetermined period from the period in which the enable control signal indicates the enable state, that is, the period in which the logic level of the sampling data signal changes, and outputs the third pulse signal to the node B (timings T3 and T5).

Thereafter, in the transmission circuit 10, the OR circuit 67 calculates the logical sum of the signal transmitted through the node A and the third pulse signal transmitted through the node B, and outputs a signal obtained by combining the two signals to the node C at timings T1 to T6. The signal output to the node C is a signal having a pulse synchronized with the rising edge and the falling edge of the sampling data signal and the rising edge of the sampling synchronization clock. The transmitting circuit 10 filters pulses synchronized with the rising edge of the sampling synchronizing clock synchronized with the rising edge and the falling edge of the sampling data signal by using the delay circuit 63, the EXOR circuit 64, and the rising edge detecting circuit with enabler 65. As a result, in the signal output to the node C, the pulse synchronized with the rising edge and the falling edge of the sampling data signal is output in preference to the pulse synchronized with the rising edge of the sampling synchronization clock.

In the transmission circuit 10, in the period in which the sampling data signal is at the high level, the pulse transmitted to the node C through the AND circuit 68 is output to the node D as the first driving pulse signal (timing T1, T4, T5). In the transmission circuit 10, the pulse transmitted to the node C through the AND circuit 69 is output as the second drive pulse signal to the node E in the period in which the sampling data signal is at the low level, at timings T2, T3, and T6.

The transmission circuit 10 drives the primary coil L1 of the isolator ISO based on the first drive pulse signal of the node D and the second drive pulse signal of the node E. As a result, the transmission circuit 10 generates a reception pulse having a positive pulse corresponding to the first drive pulse signal and a negative pulse corresponding to the second drive pulse signal at the node F of the secondary coil L2 of the isolator ISO at timings T1 to T6.

Next, the receiving circuit 20 generates pulse signals corresponding to the positive pulse of the reception pulse generated at the node F by the first receiving circuit 43 at timings T1, T4, and T5. In addition, the receiving circuit 20 generates pulse signals corresponding to the negative pulse of the received pulse generated at the node H by the second receiving circuit 45 at timings T2, T3, and T6, In the receiving circuit 20, the first decoding circuit 44 generates the received data signal RX_D based on the pulse signal of the node G and the pulse signal of the node. In the receiving circuit 20, the second receiving circuit 46 generates the reception synchronization clock RX_CLK based on the pulse signal of the node G and the pulse signal of the node F. Although the duty ratio of the reception synchronization clock RX_CLK is smaller than 50%, the duty ratio of the reception synchronization clock RX_CLK need not be 50% as long as the rising edge of the synchronization clock is synchronized with the rising edge of the reception data signal RX_D.

Figure 6:
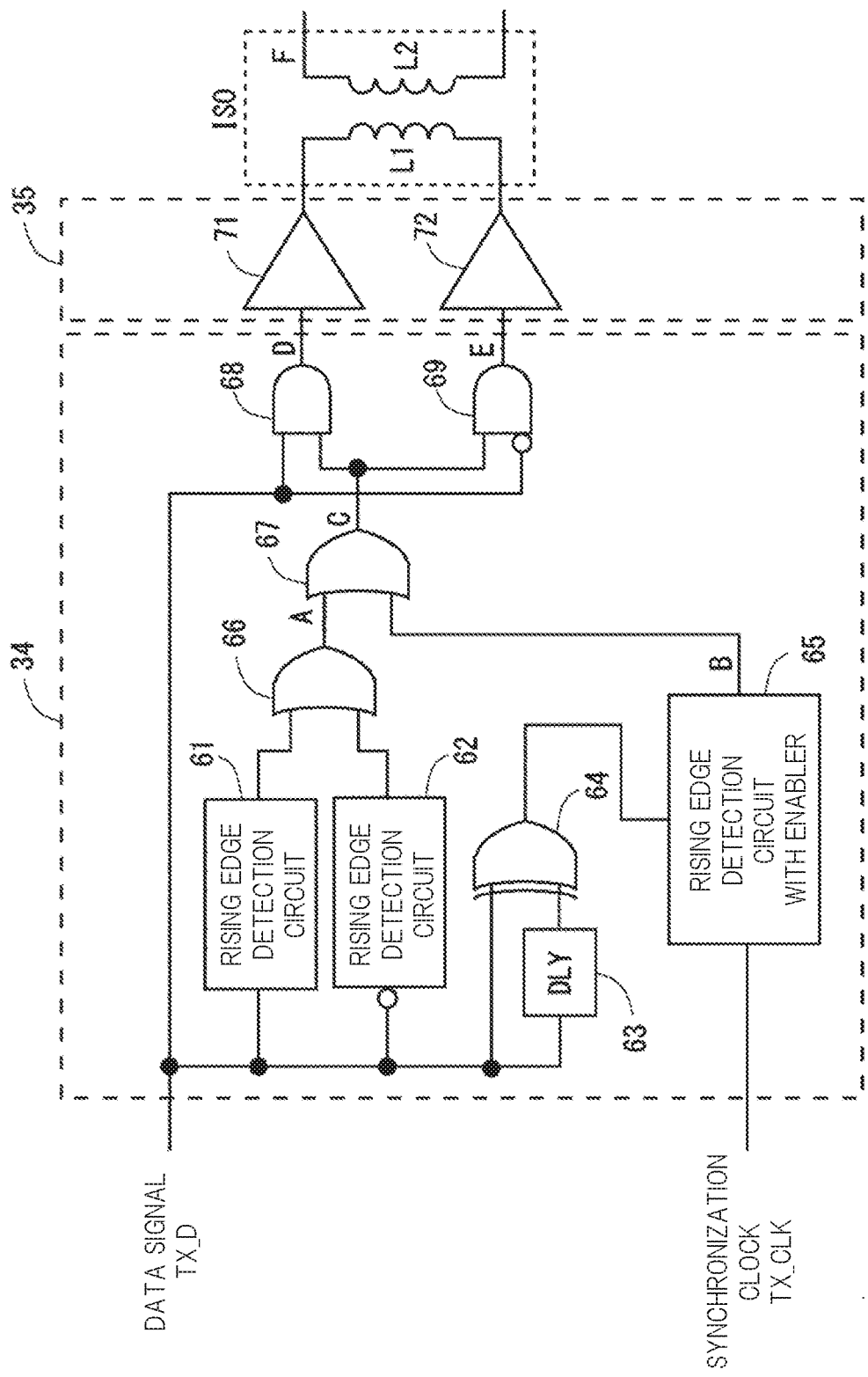
FIG. 6 is a block diagram of a transmission circuit according to a comparative example.

Here, the operation of the micro-isolator 1 according to the first embodiment will be described by taking as an example the transmission circuit 100 according to the comparative example in which the first sampling circuit 31 and the second sampling circuit 32 of the micro-isolator 1 according to the first embodiment are not used. FIG. 6 is a block diagram of a transmission circuit 100 according to a comparative example. In FIG. 6, the same components as those of the transmission circuit 10 shown in FIG. 3 are denoted by the same reference numerals as those in FIG. 3, and a description thereof is omitted.

Figure 7:
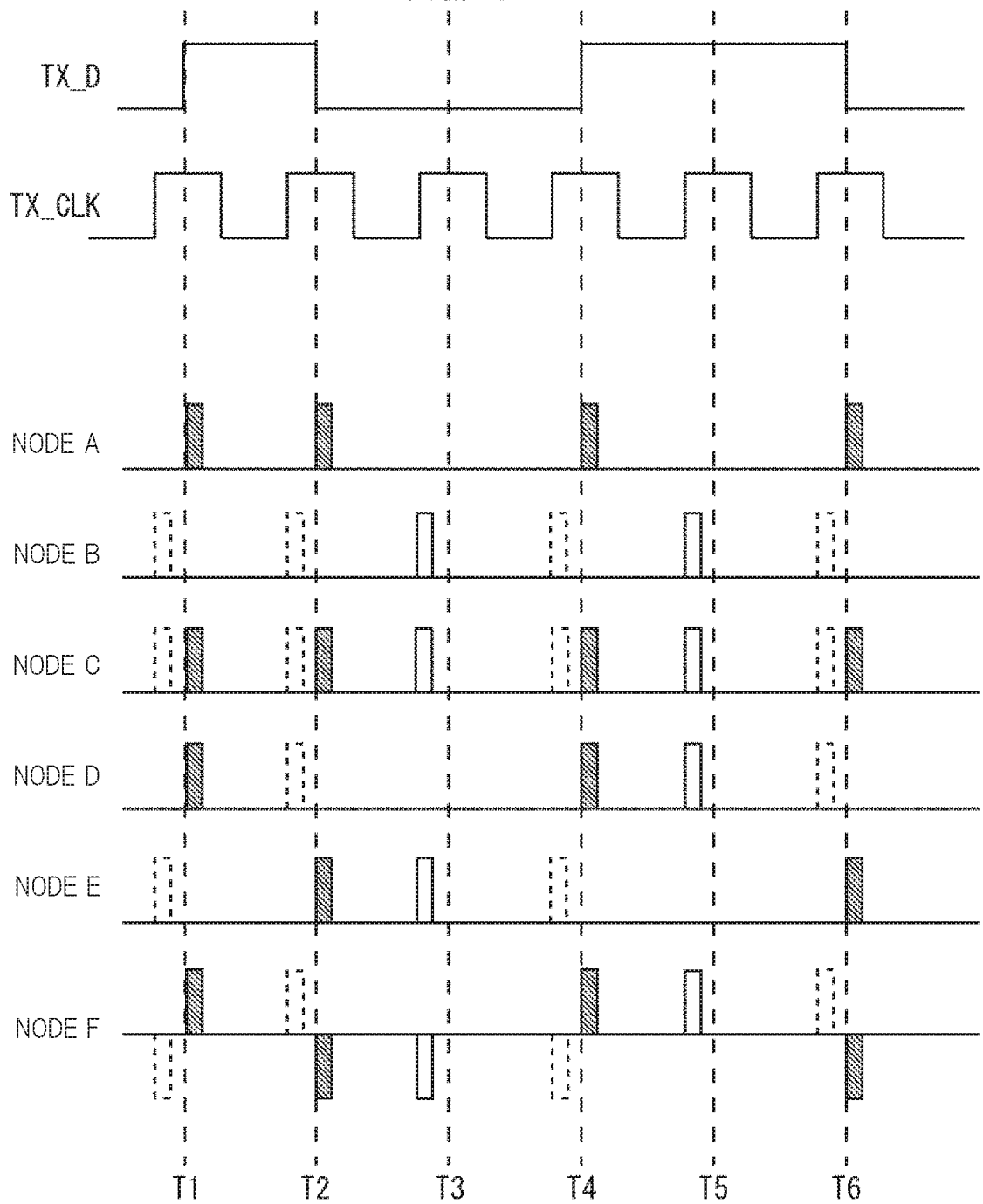
FIG. 7 is a timing chart illustrating an operation of a semiconductor device including a transmission circuit according to a comparative example.

As shown in FIG. 6, in the transmission circuit 100 according to the comparative example, the data signal TX_D and the synchronization clock TX_CLK are directly input to the synthesis circuit 34. As described above, when the data signal TX_D and the synchronizing clock TX_CLK are directly input to the synthesizing circuit 34, a problem arises when a shift occurs in the synchronizing relationship between the two signals due to jitter between the data signal TX_D and the synchronizing clock TX_CLK. FIG. 7 is a timing chart for explaining the operation of the micro-isolator when the transmission circuit 100 according to the comparative example is used. In the example shown in FIG. 7, in order to explain the influence of jitter, the magnitude of jitter is emphasized to be larger than that of actual jitter. In FIG. 7, in addition to the method of displaying the pulse caused by the edge of the data signal TX_D and the pulse caused by the synchronous clock TX_CLK, the pulse caused by the synchronous clock TX_CLK is indicated by a broken line.

In the example shown in FIG. 7, in the transmission circuit 100 according to the comparative example, when a large jitter occurs between the data signal TX_D and the synchronization clock TX_CLK, the rising edge of the synchronization clock TX_CLK is input at a timing earlier than the rising edge and the falling edge of the data signal TX_D. Therefore, in the transmission circuit 100 according to the comparative example, when such jitter occurs, the rising edge of the synchronization clock TX_CLK corresponding to the rising edge and the falling edge of the data signal TX_D is input in a state in which the rising edge detection circuit with enabler 65 effectively operates. Therefore, in the example shown in FIG. 7, in the third pulse signal output to the node B, a pulse synchronized with the rising edge of the synchronization clock TX_CLK corresponding to the rising edge and the falling edge of the data signal TX_D appears as an erroneous pulse without being filtered by the rising edge detection circuit with enabler 65. The erroneous pulse appears on the received pulse at a timing adjacent to the pulse to be originally transmitted in the received pulse of the node F, and causes erroneous transmission of the data signal and the synchronous clock.

As shown in FIG. 5 and FIG. 7, when the transmitter 10 according to the first embodiment is used, erroneous pulses due to jitters are suppressed by sampling the data signal TX_D and the synchronization clock signal TX_CLK by the sampling clock CLKi.

Here, as another operation of the micro isolator 1 according to the first embodiment, the transmission timing of the feedback signal RX_FB will be described. As shown in FIG. 4, in the micro isolator 1 according to the first embodiment, the reception synchronization clock RX_CLK has a duty ratio smaller than 50%. This is important in the return processing of the feedback signal RX_FB.

Figure 8:
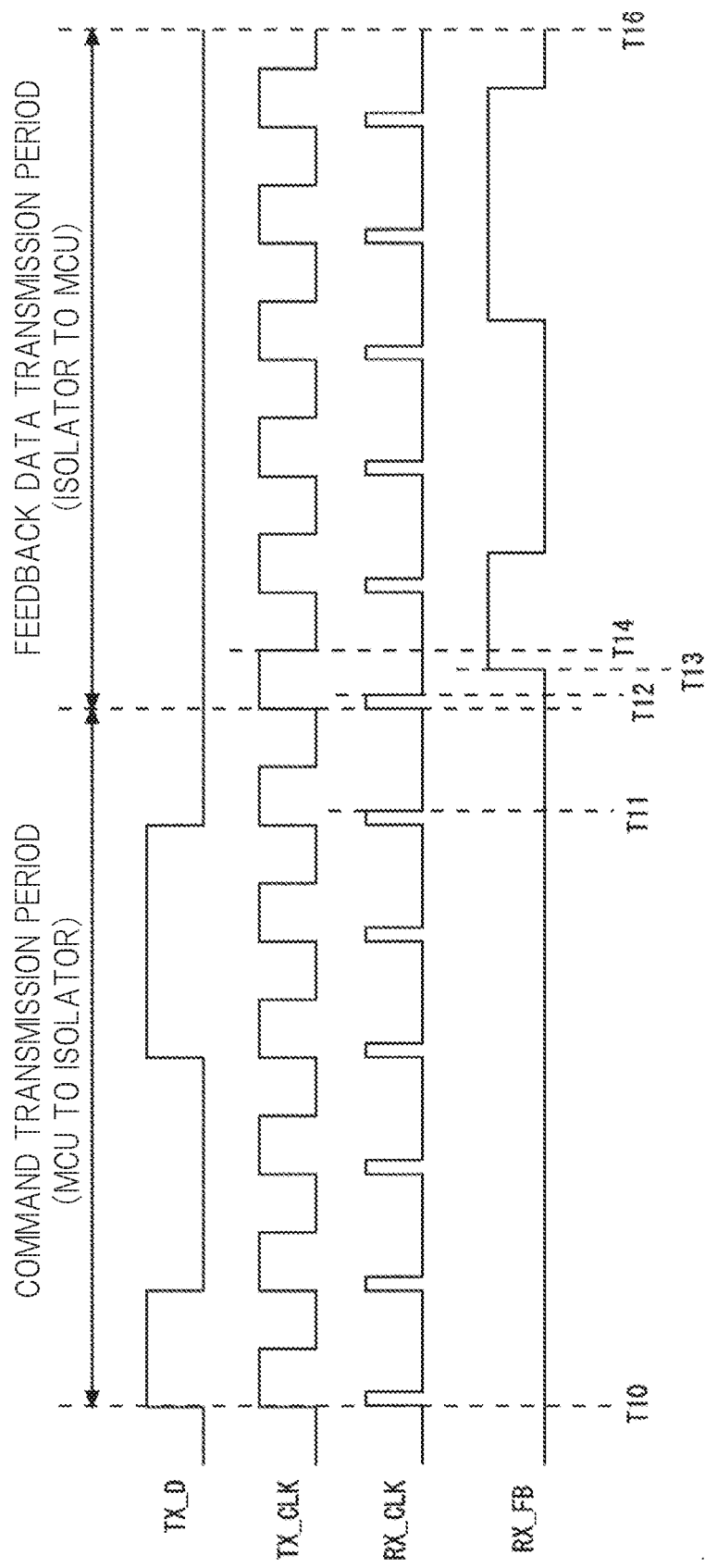
FIG. 8 is a timing chart illustrating an example of a transmission timing of a feedback signal and a feedback signal in the semiconductor device according to the first embodiment.

FIG. 8 is a timing chart for explaining an example of the transmission timing of the feedback signal and the feedback signal in the micro isolator 1 according to the first embodiment. As shown in FIG. 8, in the micro-isolator 1 according to the first embodiment, a feedback data transmission period is set in which feedback signals RX_FB are transmitted from the micro-isolator 1 to the MCU2 following a command transmission period in which a command is transmitted from the MCU2 to the micro-isolator 1.

Then, the micro isolator 1 according to the first embodiment determines the reception data based on the falling edge of the reception synchronization clock RX_CLK corresponding to the synchronization clock TX_CLK transmitted at the end of the command transmission period (timing T11).

Thereafter, the micro isolator 1 according to the first embodiment starts transmission of the feedback signal RX_FB based on the falling edge of the reception synchronization clock RX_CLK corresponding to the synchronization clock TX_CLK received at the beginning of the feedback data transmission period (timing T12). Then, in the micro-isolator 1, data serving as a feedback signal is transmitted from the transmitting circuit 22 to the receiving circuit 12 via die isolator ISO, and the rising edge of the first data of the feedback signal RX_FB reaches the MCU2 from the micro-isolator 1 at the time T13. Then, the MCU2 reads the values of the feedback signals RX_FB in response to the falling edges of the synchronization clocks TX_CLK transmitted at the beginning of the feedback data transmitting periods at time T14.

In the SPI communication, it is specified that the timing at which the feedback signal RX_FB is fetched in the MCU2 is the falling edge of the synchronous clock TX_CLK transmitted from the MCU2 to the micro-isolator 1 during the feedback data transmission period. Therefore, if the duty ratio of the reception synchronizing clock RX_CLK is the same as the duty ratio of the synchronizing clock TX_CLK, the feedback signal RX_FB may not reach the MCU2 in time at the time when the value of the feedback signal RX_FB is fetched in the MCU2. However, since the duty ratio of the reception synchronous clock RX_CLK is smaller than the duty ratio of the synchronous clock TX_CLK in the receiving circuit 20, such a problem does not occur.

As described above, in the micro-isolator 1 according to the first embodiment, the transmission circuit 10 generates the first drive pulse signal and the second drive pulse signal, and drives the isolator ISO based on the first drive pulse signal and the second drive pulse signal. At this time, the first driving pulse signal includes a pulse synchronized with both the rising edge of the sampling data signal and the rising edge of the sampling synchronization clock which are within the period in which the sampling data signal becomes the first logic level. The second driving pulse signal includes a pulse synchronized with both the falling edge of the sampling data signal and the rising edge of the sampling synchronization clock within a period in which the sampling data signal has a second logic level opposite to the first logic level. By transmitting the signal to the receiving circuit 20 connected via the isolator ISO by the first drive pulse signal and the second drive pulse signal, both the data signal and the synchronous clock can be transmitted by one isolator ISO. That is, in the micro isolator 1 according to the first embodiment, the number of isolators ISO can be reduced with respect to the number of signals transmitted from the transmission circuit 10 to the receiving circuit 20. The isolator ISO has a large circuit area, and the effect of reducing the chip area by reducing the number of isolators ISO is large.

In the micro isolator 1 according to the first embodiment, the data signal to be transmitted and the synchronization clock are sampled with the sampling clock, and the first drive pulse signal and the second drive pulse signal are generated using the sampling data signal and the sampling synchronization clock generated after sampling. As a result, in the micro-isolator 1 according to the first embodiment, it is possible to reduce the probability of erroneous transmission caused by jitter between the data signal and the synchronous clock.

Embodiment 2

In the second embodiment, a microisolator including a transmission circuit 10a which is another form of the transmission circuit 10 according to the first embodiment will be described. In the description of Embodiment Mode 2, the components described in Embodiment Mode 1 are denoted by the same reference numerals as in Embodiment Mode 1, and description thereof is omitted.

Figure 9:
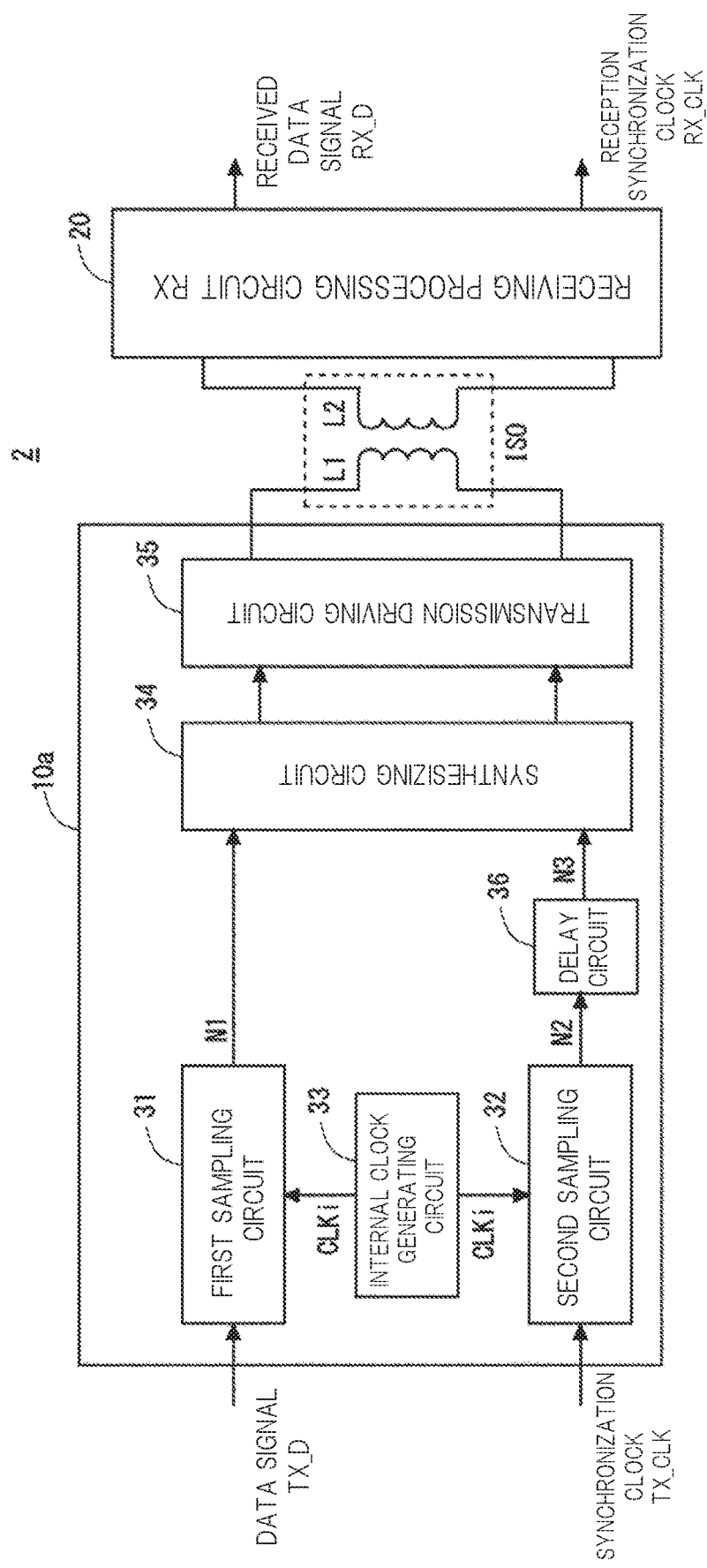
FIG. 9 is a block diagram of a transmission circuit according to a second embodiment.

FIG. 9 is a block diagram of a transmission circuit 10a according to the second embodiment. As shown in FIG. 9, the in transmission circuit 10a according to the second embodiment is obtained by adding a delay circuit 36 to the transmission circuit 10 according to the first embodiment. The delay circuit 36 is provided between the second sampling circuit 32 and the combining circuit 34. The delay circuit 36 delays the sampling synchronous clock output to the node N2 by a predetermined time. In FIG. 9, a node transmitting the sampling synchronous clock delayed by the delay circuit 36 is denoted by N3.

Figure 10:
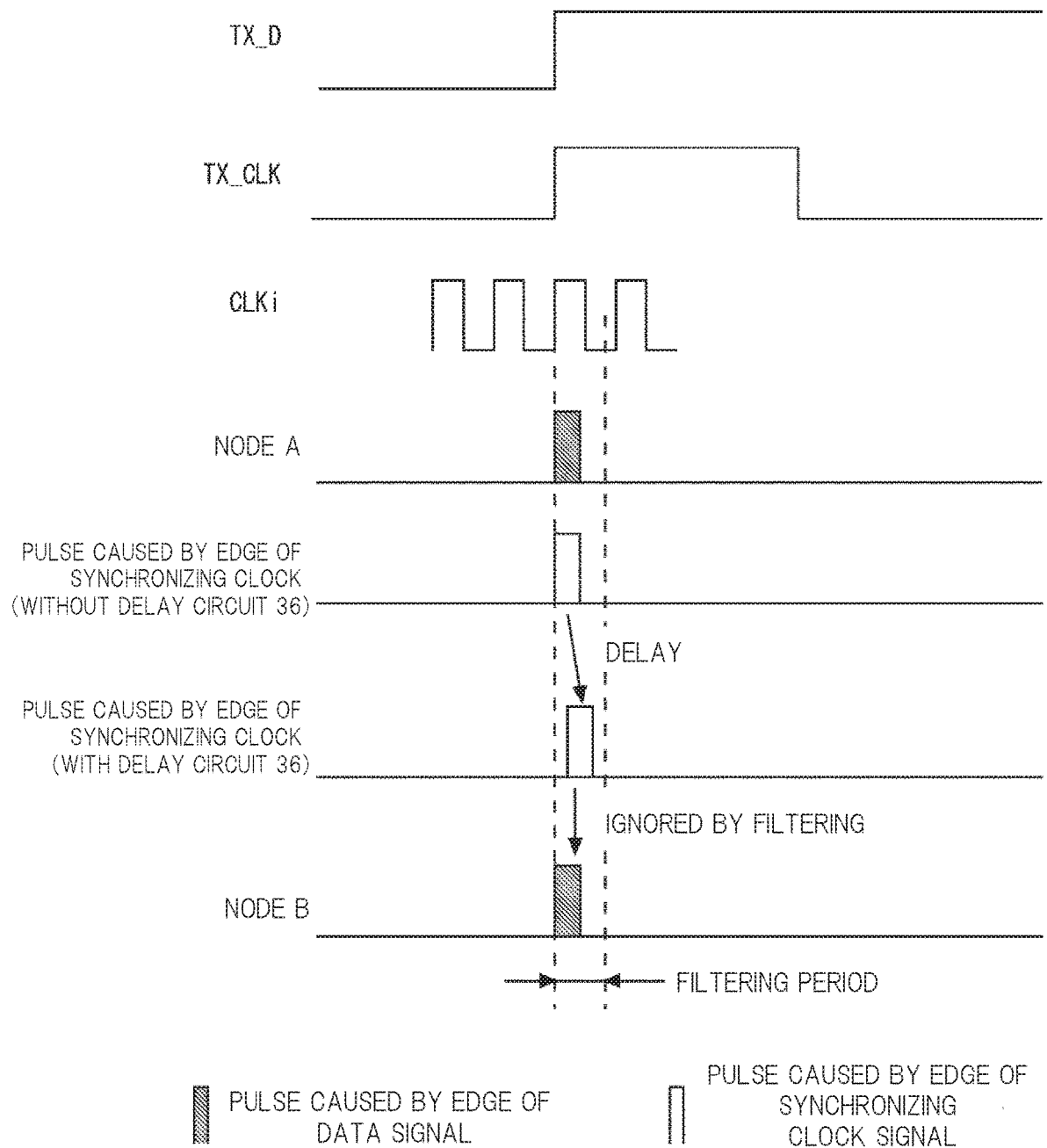
FIG. 10 is a timing chart for explaining the operation of the delay circuit according to the second embodiment.

Next, the operation of the micro-isolator when the transmission circuit 10a is used will be described. FIG. 10 is a timing chart for explaining the operation of the delay circuit 36 according to the second embodiment. The timing chart shown in FIG. 10 shows the operation around the timing T1 of the timing chart shown in FIG. 5.

As shown in FIG. 10, in the micro-isolator according to the second embodiment, the filtering period in which the rising-edge detecting circuit with enabler 65 is disabled by the enable control signals generated by the delay circuit 63 and the EXOR circuit 64 is set as a period slightly shorter than one cycle of the sampling clock CLKi.

When the delay circuit 36 is not provided, the pulse caused by the rising edge of the synchronous clock TX_CLK is generated at substantially the same timing as the pulse caused by the rising edge of the data signal TX_D output to the node A. However, when the delay circuit 36 is present, the pulse caused by the rising edge of the synchronous clock TX_CLK is generated with a slight delay with respect to the pulse caused by the rising edge of the data signal TX_D output to the node A. The delay time is set to such an extent that all of the pulses caused by the rising edge of the synchronous clock TX_CLK after the delay fall within the filtering period.

In the case where the delay circuit 36 is not provided, a part of the pulse caused by the rising edge of the synchronous clock TX_CLK may extend out of the filtering period due to an error or the like in the circuit operation due to the influence of the parasitic resistance or the parasitic capacitance in the circuit, and the pulse of the extended part may be output to the node B. On the other hand, in the case where the delay circuit 36 is provided, even if the error of the circuit operation or the like is matched, the pulse caused by the rising edge of the synchronous clock TX_CLK is generated with a margin in the temporal context with respect to the filtering period. Therefore, in the case where the delay circuit 36 is provided, even when there is an error or the like in the circuit operation, the pulse caused by the rising edge of the synchronous clock TX_CLK can be more reliably ignored by the filtering than in the case where the delay circuit 36 is not provided.

As described above, by using the transmission circuit 10a according to the second embodiment, it is possible to remove the pulse caused by the rising edge of the synchronous clock TX_CLK more reliably than the micro isolator 1 according to the first embodiment.

Embodiment 3

In the third embodiment, r microisolator including a transmission circuit 10b which is another form of the transmission circuit 10 according to the first embodiment will be described. Note that in the description of Embodiment 3, the components described in Embodiment 1 are denoted by the same reference numerals as in Embodiment 1, and description thereof is omitted.

Figure 11:
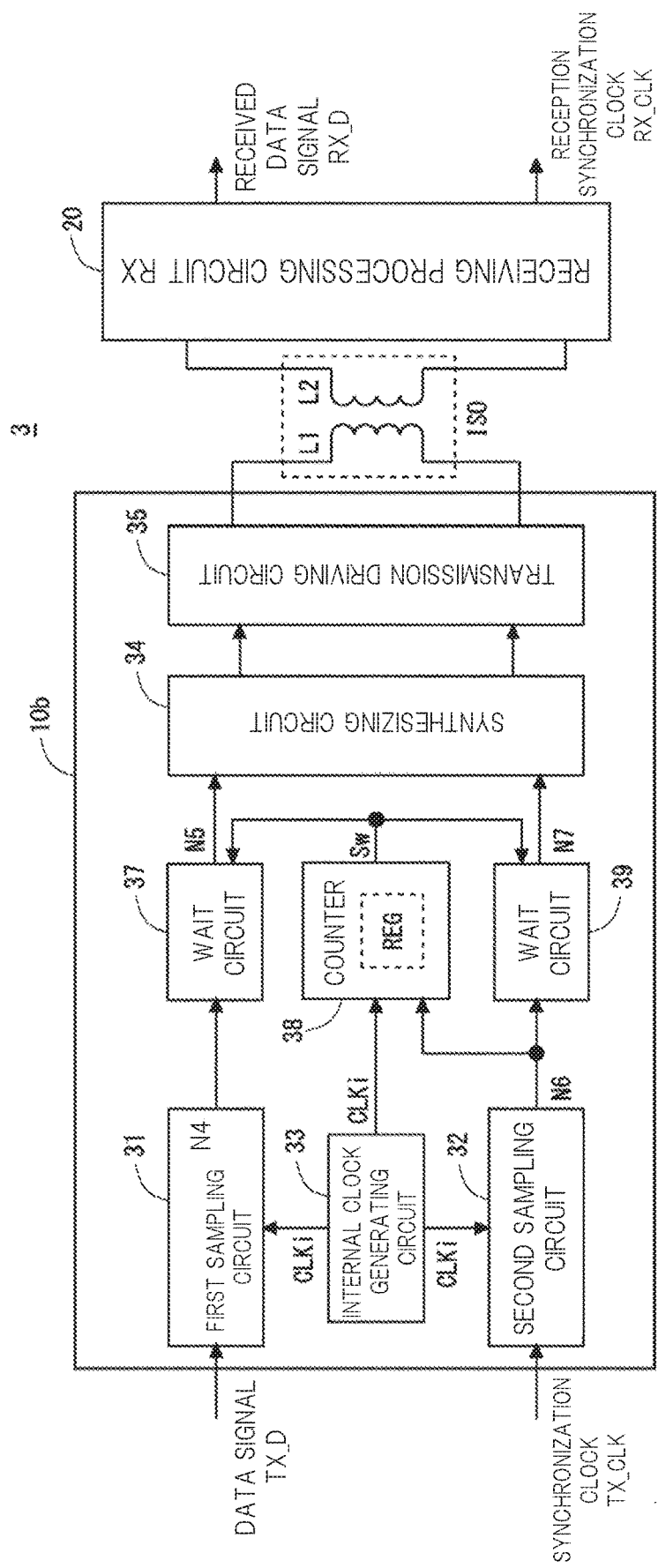
FIG. 11 is a block diagram of a transmission circuit according to a third embodiment.

FIG. 11 is a block diagram of a transmission circuit 10b according to the third embodiment. As shown in FIG. 11, the transmission circuit 10b according to the third embodiment is obtained by adding a first wait circuit 37, a counter 38, and a second wait circuit 39 to the transmission circuit 10 according to the first embodiment.

The counter 38 counts the number of sampling clock CLKi input-after the logical level of the sampling synchronization clock output by the second sampling circuit 32 has changed, and the wait release signal Sw is enabled when the number of counts reaches a predetermined number. The predetermined number defining the number of clocks counted by the counter 38 is determined, for example, by setting the MCU2 to the register REG of the counter 38.

The first wait circuit 37 waits for a change in the logic level of the sampling data signal to be transmitted to a circuit in a subsequent stage, for example, the synthesis circuit 34, until the wait release signal Sw becomes an enabled state with respect to the change in the logic level of the sampling data signal.

The second wait circuit 39 waits for a change in the logic level of the sampling synchronizing clock to be transmitted to a circuit in a subsequent stage, for example, the synthesizing circuit 34, until the wait release signal Sw becomes an enabled state with respect to the change in the logic level of the sampling synchronizing clock.

Figure 12:
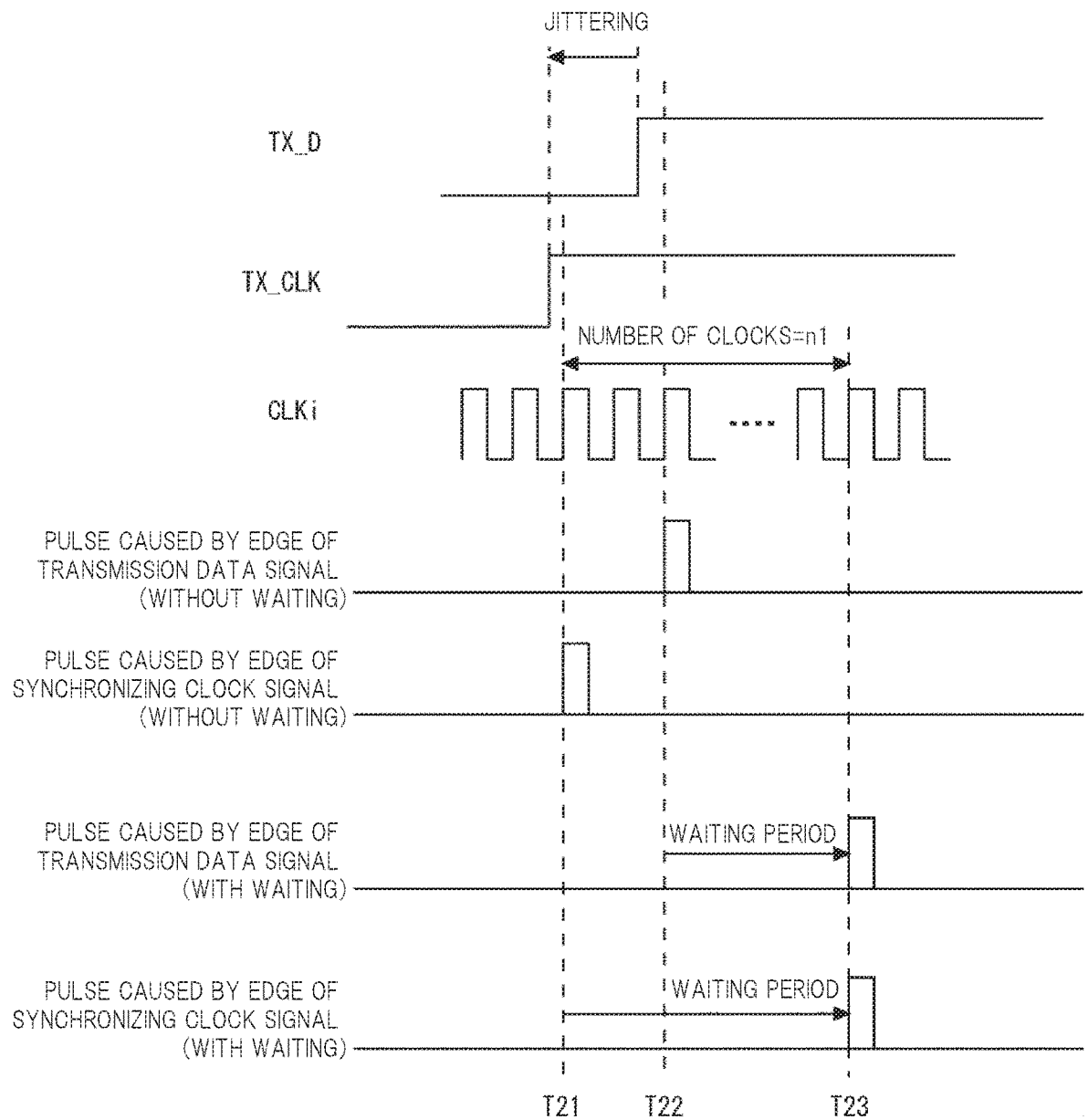
FIG. 12 is a timing chart for explaining a first operation example when the transmission circuit according to the third embodiment is used.
Figure 13:
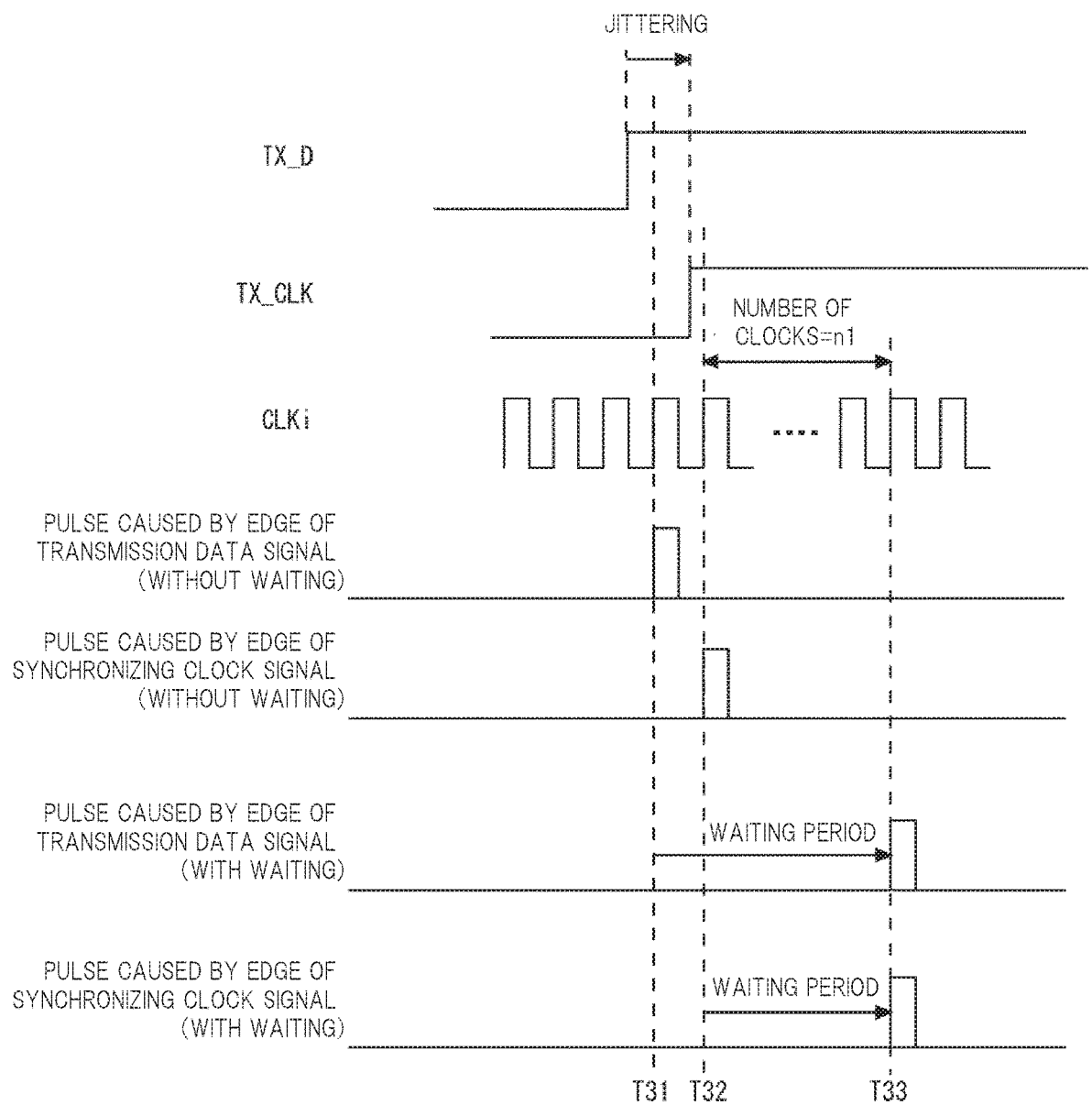
FIG. 13 is a timing chart for explaining a second operation example when the transmission circuit according to the third embodiment is used.

Next, the operation of the micro-isolator when the transmission circuit 10b is used will be described. FIG. 12 is a timing chart for explaining a first operation example of the micro-isolator when the transmission circuit 10b according to the third embodiment is used. FIG. 13 is a timing chart for explaining a second operation example of the micro-isolator when the transmission circuit 10b according to the third embodiment is used. The first operation example shown in FIG. 12 shows an example in which jitter occurs in the direction in which the phase of the synchronous clock TX_CLK advances with respect to the data signal TX_D. The second operation example shown in FIG. 13 shows an example in which jitter occurs in a direction in which the phase of the synchronous clock TX_CLK lags behind that of the data signal TX_D. Note that the timing charts shown in FIGS. 12 and 13 show operations in the vicinity of the timing T1 of the timing chart shown in FIG. 5.

In the example shown in FIG. 12, the rising edge of the synchronous clock TX_CLK is sampled at timing T21, and the rising edge of the data signal TX_D is sampled at timing T22. When the transmitter 10b according to the third embodiment is used, the output timing of the pulse caused by the rising edge of the data transmission TX_D and the output timing of the pulse caused by the rising edge of the synchronization clock signal TX_CLK are delayed until N1 sampling clocks CLKi are input from the timing T21. In FIG. 12, the pulse caused by the rising edge of the data signal TX_D and the pulse caused by the rising edge of the synchronous clock TX_CLK are ouput together, but in reality, the pulse caused by the rising edge of the synchronous clock TX_CLK is filtered by the rising edge detection circuit with enabler 65, and thus is not output to the node B.

As shown in FIG. 13, the rising edge of the data signal TX_D is sampled at timing T31, and the rising edge of the synchronous clock TX_CLK is sampled at timing T32. When the transmitter 10b according to the third embodiment is used, the output: timing of the pulse caused by the rising edge of the data transmission TX_D and the output timing of the pulse caused by the rising edge of the synchronization clock signal TX_CLK are delayed until N2 sampling clocks CLKi are input from the timing T32. In FIG. 13, the pulse caused by the rising edge of the data signal TX_D and the pulse caused by the rising edge of the synchronous clock. TX_CLK are output together, but in reality, the pulse caused by the rising edge of the synchronous clock TX_CLK is filtered by the icing edge detection circuit with enabler 65, and thus is not output to the node B.

As described above, by using the transmitting circuit 10b according to the third embodiment, even when jitter larger than one cycle of the sampling clock CLKi occurs, the pulse caused by the synchronous clock TX_CLK corresponding to the rising edge of the data signal TX_D can be filtered by the rising edge detecting circuit with enabler 65 by using the rising edge detecting circuit with enabler 65. As a result, in the micro isolator using the transmission circuit 10b, it is possible to prevent erroneous transmission of data with respect to a larger jitter than in the other embodiments.

Embodiment 4

In the fourth embodiment, a data format of a data signal for preventing erroneous transmission of data in the micro isolator 1 will be described. Note that in the description of Embodiment 4, the components described in Embodiment 1 are denoted by the same reference numerals as in Embodiment 1, and description thereof is omitted.

Figure 14:
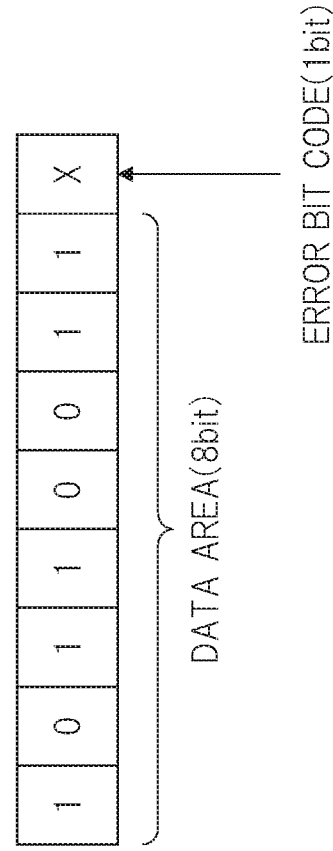
FIG. 14 is a diagram illustrating a data format of a data signal used in the semiconductor device according to the fourth embodiment.

FIG. 14 is a diagram illustrating a data format of a data signal used in the micro isolator 1 according to the fourth embodiment. In the example shown in FIG. 14, the data signal used in the micro isolator 1 according to the fourth embodiment includes an 8-bit data area and a 1-bit error bit code. Data values transmitted from the MCU2 to the micro-isolator 1 are stored in the data area. The error bit code is an ECC (Error Collection Code) used to verify the validity of the data value.

In the micro isolator 1, the SPI logic 23 extracts an error bit code from the received data signal and verifies the validity of the data stored in the data area. That is, the SPI logic 23 functions as an error detection circuit that verifies the validity of the data value using the data value and the error bit code included in the received data. If there is an error in the data values, the SPI logic 23 executes a process of requesting the MCU2 to retransmit the data. On the other hand, if the validity of the data value can be confirmed, the SPI logic 23 performs processing based on the received data value.

Here, a method of generating a data signal including the error bit code will be described. FIG. 25 is a flowchart for explaining a procedure for generating a data signal in the micro isolator 1 according to the fourth embodiment.

The process shown in FIG. 15 is performed by MCU2. In the example shown in FIG. 15, the MCU2 first generates data values (e.g., transmit data) to be stored in the data areas of the data signals (S1). In operation S2, the MCU2 calculates an error bit code of the transmitted data. In operation S3, the MCU2 adds an error bit code to the transmitted data to generate the data signals shown in FIG. 14.

Next, a MCU2 receiving process based on the received data including the error bit code will be described. FIG. 16 is a flowchart for explaining the reception processing on the receiving circuit side of the micro-isolator 1 according to the fourth embodiment. The processing shown in FIG. 16 is mainly performed by the SPI logic 23 of the micro-isolator 1.

As shown in FIG. 16, in the micro-isolator 1, a reception error bit code EBC2 is calculated from data values (for example, reception data) included in the data area of the reception data (step S11). In operation S12, the micro-isolator 1 compares the reception error bit code EBC2 with the error bit code EBC1 in the error bit code area of the received data signal.

Thereafter, if the error bit code EBC2 and the error bit code EBC1 do not match, the micro-isolator 1 discards the received data (step S15), generates an error notification signal (step S16), and transmits the generated error notification signal to the MCU2 (step S17). On the other hand, if the error bit code EBC2 matches the error bit code EBC1, the micro-isolator 1 performs a process based on the received data in operation S14.

As described above, by using the data signal including the error bit code according to the fourth embodiment, it becomes easy to confirm the validity of the received data in the micro-isolator 1, and therefore, it is possible to improve the resistance to erroneous transmission of data compared with the micro-isolator according to the other embodiment.

Although the invention made by the inventor has been specifically described based on the embodiment, the present invention is not limited to the embodiment already described, and it is needless to say that various modifications can be made without departing from the gist thereof.

What is claimed is:

1. A communication device comprising:
 a transmission circuit configured to generate a transmission pulse signal based on a data signal and a synchronizing clock signal; and
 a receiving circuit configured to generate a reception data signal and a reception synchronizing clock signal based on the transmission pulse signal,
 wherein the transmission pulse signal comprising a plurality of first pulses and a plurality of second pulses,
 wherein a polarity of each of the first pulses corresponds to a signal level of the data signal,
 wherein a polarity of each of the second pulses corresponds to a reception data signal,
 wherein the receiving circuit comprises:
  a sampling circuit configured to detect rising edges and falling edges of the data signal and the synchronizing clock signal by a sampling clock signal; and
  a synthesis circuit configured to generate the transmission pulse signal comprising a plurality of first pulses and a plurality of second pulses,
 wherein each of the first pulses corresponds to one the rising edges or the falling edges of the data signal, and
 wherein each of the second pulses corresponds to one of the rising edges or the falling edges of the synchronizing clock signal.

2. The communication device according to claim 1,
 wherein a data stream of the reception data signal corresponds to a data stream of the data signal, and
 wherein a clock period of the reception synchronizing clock signal corresponds to a clock period of the synchronizing clock signal.

3. The communication device according to claim 1,
 wherein a pulse period of the transmission pulse signal corresponds to a clock period of the synchronizing clock signal.

4. The communication device according to claim 1, further comprising an isolator configured to transmit the transmission pulse signal from a first terminal to a second terminal by electromagnetic coupling,
 wherein the transmission circuit is connected to the first terminal, and
 wherein the receiving circuit is connected to the second terminal.

5. The communication device according to claim 1,
 wherein the synthesis circuit output the first pulse when the rising edges or the falling edges are detected on both the data signal and the synchronizing clock signal at the same sampling period of the sampling clock signal.

6. The communication device according to claim 1,
wherein the receiving circuit further comprises a delay circuit configured to delay the detected rising edges and the falling edges of the data signal by a predetermined delay amount.

7. A communication method for transmit a data signal and a synchronizing clock signal from a transmission circuit to a receiving circuit, the communication method comprising:

generating a transmission pulse signal based on the data signal and the synchronizing clock signal by the transmission circuit;

transmitting the transmission pulse signal from the transmission circuit to the receiving circuit;

generating a reception data signal and a reception synchronizing clock signal based on the transmission pulse signal by the receiving circuit; and detecting rising edges and falling edges of the data signal and the synchronizing clock signal by a sampling clock signal, wherein the transmission pulse signal comprising a plurality of first pulses and a plurality of second pulses, wherein a polarity of each of the first pulses corresponds to a signal level of the data signal, wherein a polarity of each of the second pulses corresponds to a reception data signal, wherein the transmission pulse signal comprises a plurality of first pulses and a plurality of second pulses, wherein each of the first pulses corresponds to one the rising edges or the falling edges of the data signal, and wherein each of the second pulses corresponds to one of the rising edges or the falling edges of the synchronizing clock signal.

8. The communication method according to claim 7,
wherein a data stream of the reception data signal corresponds to a data stream of the data signal, and
wherein a clock period of the reception synchronizing clock signal corresponds to a clock period of the synchronizing clock signal.

9. The communication method according to claim 7,
wherein a pulse period of the transmission pulse signal corresponds to a clock period of the synchronizing clock signal.

10. The communication method according to claim 7, wherein
the transmitting is performed by electromagnetic coupling between the transmission circuit and the receiving circuit.

11. The communication method according to claim 7, wherein the generating of the transmission pulse signal comprises:

outputting the first pulse when one of the rising edges or the falling edges is detected on the data signal at a sampling period of the sampling clock signal; and outputting the second pulse when one of the rising edges or the falling edges is detected on the synchronizing clock signal at the sampling period of the sampling clock signal, and outputting the first pulse when the rising edges or the falling edges are detected on both the data signal and the synchronizing clock signal at the same sampling period of the sampling clock signal.

12. The communication method according to claim 11,
wherein the generating of the transmission pulse signal further comprises:
delaying the detected rising edges and the falling edges of the data signal by a predetermined delay amount.

* * * * *